United States Patent
Berggren et al.

(10) Patent No.: US 9,578,639 B2
(45) Date of Patent: Feb. 21, 2017

(54) METHODS AND NODES IN A WIRELESS COMMUNICATION SYSTEM

(71) Applicant: Huawei Technologies Co., Ltd., Shenzhen (CN)

(72) Inventors: Fredrik Berggren, Kista (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 14/671,910

(22) Filed: Mar. 27, 2015

(65) Prior Publication Data

US 2015/0208408 A1 Jul. 23, 2015

Related U.S. Application Data

(63) Continuation of application No. PCT/EP2012/076589, filed on Dec. 21, 2012.

(30) Foreign Application Priority Data

Sep. 27, 2012 (WO) ................ PCT/EP2012/069023

(51) Int. Cl.
*H04W 72/04* (2009.01)
*H04L 1/18* (2006.01)
*H04L 5/00* (2006.01)

(52) U.S. Cl.
CPC ........ *H04W 72/0446* (2013.01); *H04L 1/1812* (2013.01); *H04L 1/1861* (2013.01);
(Continued)

(58) Field of Classification Search
CPC . H04L 1/1861; H04L 5/0053; H04W 72/0446; H04W 72/0413; H04W 72/042
See application file for complete search history.

(56) References Cited

U.S. PATENT DOCUMENTS

2008/0056390 A1 3/2008 Rainbolt et al.
2008/0273513 A1 11/2008 Montojo et al.
(Continued)

FOREIGN PATENT DOCUMENTS

JP 2010527543 A 8/2010
JP 2010527567 A 8/2010
(Continued)

OTHER PUBLICATIONS

"$3^{rd}$ Generation Partnership Project; Technical Specification Group Radio Access Network; Evolved Universal Terrestrial Radio Access (E-UTRA); Physical Channels and Modulation (Release 11)," 3GPP TS 36.211, V11.0.0, pp. 1-106, $3^{rd}$ Generation Partnership Project, Valbonne, France (Sep. 2012).
(Continued)

*Primary Examiner* — Khaled Kassim
*Assistant Examiner* — Syed S Ali
(74) *Attorney, Agent, or Firm* — Leydig, Voit & Mayer, Ltd.

(57) ABSTRACT

Methods and nodes, for assignment of uplink control channel resources for providing HARQ feedback for data transmitted on a downlink data channel associated with a downlink control channel. The downlink control channel comprises at least a set of downlink control channel resources, which is configurable over a subset of available time frequency resources. The method comprises dividing the set of downlink control channel resources into at least two subsets of references, comprising indices to the respective downlink control channel resources. Also, the method comprises defining, for each such subset of references, an associated subset of references comprising indices to unique uplink control channel resources. Furthermore, the method comprises associating each element in the subset of references with a subframe and an element in the subset of
(Continued)

references. Additionally, the method further comprises transmitting data on the downlink data channel associated with the downlink control channel.

13 Claims, 8 Drawing Sheets

(52) U.S. Cl.
CPC ......... *H04L 5/0053* (2013.01); *H04W 72/042* (2013.01); *H04W 72/0413* (2013.01); *H04L 1/1893* (2013.01)

(56) References Cited

U.S. PATENT DOCUMENTS

| | | | | |
|---|---|---|---|---|
| 2009/0274078 | A1* | 11/2009 | Zhao | H04W 72/0413 370/293 |
| 2009/0303956 | A1 | 12/2009 | Chen et al. | |
| 2011/0096745 | A1* | 4/2011 | Ahn | H04L 5/0016 370/329 |
| 2011/0235599 | A1* | 9/2011 | Nam | H04L 1/0027 370/329 |
| 2011/0292900 | A1* | 12/2011 | Ahn | H04L 1/1607 370/329 |
| 2012/0218935 | A1* | 8/2012 | Zhang | H04B 7/15542 370/315 |

FOREIGN PATENT DOCUMENTS

| | | | |
|---|---|---|---|
| JP | 2011517168 | A | 5/2011 |
| JP | 2011519201 | A | 6/2011 |
| WO | WO 2008137864 | A2 | 11/2008 |
| WO | WO 2009116754 | A2 | 9/2009 |
| WO | WO 2009120888 | A2 | 10/2009 |
| WO | WO 2012094151 | A2 | 7/2012 |

OTHER PUBLICATIONS

"PUCCH resource allocation in response to E-PDCCH," 3GPP TSG RAN1 #69, Prague, Czech Republic, R1-122456, 3$^{rd}$ Generation Partnership Project, Valbonne, France (May 21-25, 2012).

"Remaining aspects of PUCCH resource allocation," 3GPP TSG RAN WG1 Meeting #70, Qingdao, China, R1-123846, 3$^{rd}$ Generation Partnership Project, Valbonne, France (Aug. 13-17, 2012).

* cited by examiner

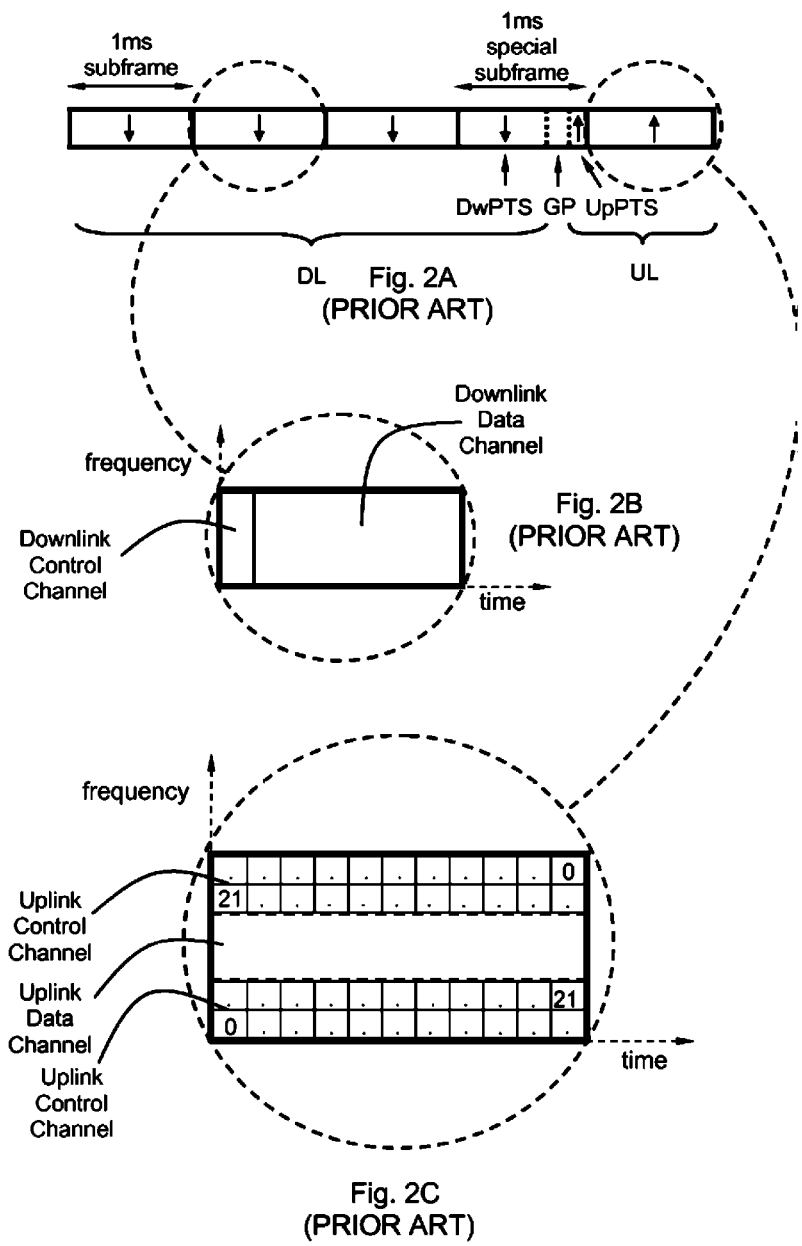

METHODS AND NODES IN A WIRELESS COMMUNICATION SYSTEM

CROSS-REFERENCE TO RELATED APPLICATIONS

This application is a continuation of International Patent Application No. PCT/EP2012/076586, filed Dec. 21, 2012, which claims priority to International Application No. PCT/EP2012/069023, filed on Sep. 27, 2012, both of which are hereby incorporated by reference in their entireties.

FIELD OF INVENTION

Implementations described herein relate generally to a radio network node, a method in a radio network node, a receiver and a method in a receiver. In particular is herein described a mechanism for assignment of uplink control channel resources for providing feedback for transmitted data.

BACKGROUND OF INVENTION

A receiver, also known as User Equipment (UE), mobile station, wireless terminal and/or mobile terminal is enabled to communicate wirelessly in a wireless communication system, sometimes also referred to as a cellular radio system. The communication may be made e.g. between two receivers, between a receiver and a wire connected telephone and/or between a receiver and a server via a Radio Access Network (RAN) and possibly one or more core networks.

The receiver may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication system covers a geographical area which is divided into cell areas, with each cell area being served by a radio network node, or base station e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The geographical area where radio coverage is provided by the radio network node/base station at a base station site is sometimes referred to as a cell. Cell may more generally be referred to as a logical concept transmitting radio signals without having any physical meaning. One radio network node, situated on the base station site, may serve one or several cells. The radio network nodes communicate over the air interface operating on radio frequencies with the receivers within range of the respective radio network node.

In some radio access networks, several radio network nodes may be connected, e.g. by landlines or microwave, to a Radio Network Controller (RNC) e.g. in Universal Mobile Telecommunications System (UMTS). The RNC, also sometimes termed Base Station Controller (BSC) e.g. in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), radio network nodes, which may be referred to as eNodeBs or eNBs, may be connected to a gateway e.g. a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction i.e. from the receiver to the radio network node.

Contemporary wireless systems, such as the 3GPP LTE such as e.g. Evolved Universal Terrestrial Radio Access (E-UTRA) and/or Evolved UMTS Terrestrial Radio Access Network (E-UTRAN), utilize packet based transmissions. Upon reception of a data packet, the receiver (UE in 3GPP terminology) transmits Hybrid Automatic Repeat Request (HARQ) messages to the radio network node (eNodeB in 3GPP terminology). These messages may for example comprise an acknowledgement (ACK) or a negative ACK (NACK). New packet transmission or packet retransmissions could subsequently be initialized by the transmitter once the HARQ feedback is obtained. HARQ feedback signalling will require uplink transmission resources and it is essential to minimize the amount of time-frequency resources to be allocated for HARQ feedback since unused uplink resources could be utilized for transmitting user data instead. A further problem is to assign the uplink HARQ resources to the receiver without incurring significant signalling in the downlink and typically uplink resources may only be assigned when there is an actual data packet transmitted and HARQ feedback is expected. The assignment of the set of uplink resources also has to assure that there are no uplink resource conflicts, i.e., each receiver/UE must be assigned a set of unique uplink resources for HARQ.

In order to divide forward and reverse communication channels on the same physical communications medium, when communicating in the wireless communication system, a duplexing method may be applied such as e.g. Frequency-Division Duplexing (FDD) and/or Time-Division Duplexing (TDD). The FDD approach is used over well separated frequency bands in order to avoid interference between uplink and downlink transmissions. In TDD, uplink and downlink traffic are transmitted in the same frequency band, but in different time intervals. The uplink and downlink traffic is thus transmitted separated from each other, in the time dimension in a TDD transmission, possibly with a Guard Period (GP) in between uplink and downlink transmissions. In order to avoid interference between uplink and downlink, for radio network nodes and/or receivers in the same area, uplink and downlink transmissions between radio network nodes and receivers in different cells may be aligned by means of synchronization to a common time reference and use of the same allocation of resources to uplink and downlink.

Thus, when applying FDD, the same numbers of uplink and downlink subframes are available during a radio frame, why HARQ feedback may be provided in an uplink subframe for each received downlink subframe and vice versa. In other words, every downlink subframe can be associated to a specific later uplink subframe for feedback generation in way that this association is one-to-one, i.e. to each uplink subframe is associated exactly one downlink subframe. However, in TDD the number of uplink and downlink subframes may be different in some configurations, for example comprising more downlinks subframes than uplink subframes, as illustrated in FIG. 1A.

Generally, one HARQ message is associated with each downlink subframe, since a data packet (e.g., transport block in LTE) is transmitted in one subframe. This implies that HARQ messages from multiple downlink subframes may need to be transmitted in a single uplink subframe, which requires allocation of multiple unique uplink resources for HARQ. In such scenario, comprising e.g. four downlink subframes for each uplink subframe, the receiver has to provide HARQ feedback for all the four downlink subframes in one single uplink subframe, as illustrated in FIG. 1B. When doing so, the HARQ feedback may occupy a significant amount of the uplink communication resources. Hence, in particular for TDD, where an uplink subframe may comprise HARQ messages for many users and from multiple subframes, it is essential that the network nodes can make an efficient uplink resource assignment. This becomes particularly important when there are fewer uplink subframes than downlink subframes in a radio frame, since the amount of reserved uplink control channel resources impacts the available resources for data transmission.

A further constraint for TDD is that a unique allocation is needed for uplink resources that are associated with downlink data transmissions in different downlink subframes.

It is thus a problem to allocate uplink transmit resources for HARQ feedback in a TDD system, such that resources are unique for different subframes while minimizing the uplink resource overhead.

In LTE, the smallest time-frequency entity that may be used for transmission is referred to as a Resource Element (RE), which may convey a complex-valued modulation symbol on a subcarrier. A Resource Block (RB) comprises a set of REs (e.g., 7*12=84 REs) and is of 0.5 ms duration (e.g., 7 Orthogonal Frequency-Division Multiplexing (OFDM) symbols) and 180 kHz bandwidth (e.g., 12 subcarriers with 15 kHz spacing). The transmission bandwidth of the carrier is divided into a set of RBs. Typical LTE carrier bandwidths correspond to 6, 15, 25, 50, 75 and 100 RBs. Data may be transmitted in the downlink on the Physical Downlink Shared Data Channel (PDSCH), which is scheduled by an associated Physical Downlink Control Channel (PDCCH). The PDCCH is first detected and contains information on the transmission format of the PDSCH. Each transmission of user data (i.e., a transport block) on the PDSCH is performed over 1 ms duration (which is also referred to as a subframe) on one or several RBs and a radio frame consists of 10 subframes.

OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier.

OFDM has developed into a popular scheme for wideband digital communication, whether wireless or over copper wires, used in applications such as digital television and audio broadcasting, Digital Subscriber Line (DSL; originally: Digital Subscriber Loop) broadband internet access, wireless networks, and 4G mobile communications.

In the LTE system, HARQ feedback may be transmitted on the Physical Uplink Control Channel (PUCCH). Here, the notion of PUCCH resource relates to a transmit sequence, a modulation symbol (such as e.g., a Quadrature Phase-Shift Keying (QPSK) or Binary Phase-Shift Keying (BPSK) complex-valued symbol) and a time-frequency resource (e.g., a set of REs or RBs). In general, the more PUCCH resources that are needed for HARQ feedback the less available time-frequency resources for transmitting data on the uplink. In some instances, there is a need to transmit multiple HARQ messages in a subframe, e.g., for TDD as explained above. Another example is for downlink carrier aggregation, where the receiver/UE is simultaneously receiving data from multiple carriers and where independent HARQ messages should be fed back for each carrier. However, the LTE system does not allow HARQ feedback by simultaneous transmission on multiple PUCCH resources since that requires large power back-off in the receiver/UE which causes smaller coverage and worse reliability. Instead, multiple HARQ messages may be fed back on a single PUCCH resource by means of so called channel selection which implies that a set of multiple PUCCH resources (i e., channels) is allocated to the receiver/UE and HARQ information from multiple messages is encoded by which PUCCH resource the receiver/UE selects from the set, together with the modulation symbol transmitted on the selected resource. Channel selection is applicable in LTE for TDD with and without carrier aggregation and for FDD with carrier aggregation.

One type of PUCCH resource allocation for TDD with channel selection is based on implicit reservation. That is the PUCCH resources are not signalled to the receiver/UE, but the receiver/UE determines the resources implicitly from the downlink control channel that schedules the downlink data (PDCCH). This is possible since the PDCCH may be transmitted on one or several Control Channel Elements (CCEs), which denote a set of time-frequency resources. Each PDCCH occupies a unique set of CCEs and a one-to-one mapping may therefore be made from an occupied CCE (the index of the first CCE of the PDCCH is used) to a PUCCH resource, without any resource conflict. An advantage of this is that uplink resources are only reserved when data is transmitted and HARQ feedback is expected, while avoiding introducing uplink resource signalling in the downlink control channel.

As a further development of the LTE system, an Enhanced PDCCH (EPDCCH) is supported. The EPDCCH structure is fundamentally different from that of the PDCCH, e.g., it is based on receiver-specific demodulation reference signals instead of cell-specific reference signals. This enables the use of precoded (i.e., receiver-specifically beam formed) reference signals. While the PDCCH is defined (and can thus be transmitted) over the whole system bandwidth, the EPDCCH may be confined to a configurable receiver-specific set of RBs (i.e., EPDCCH set) and the receiver/UE may be configured with multiple EPDCCH sets. This enables that inter-cell interference coordination could be performed for the EPDCCH by arranging disjoint EPDCCH sets in different cells. Each EPDCCH set comprises a group of (e.g., 2, 4 and 8) Physical Resource Block (PRB) pairs and each PRB pair comprises a set of (e.g., 16) Enhanced Resource Element Groups (EREGs). In turn, the set of EREGs in a PRB pair constitute Enhanced CCEs (ECCEs). The number of ECCEs per PRB pair may typically be 2 or 4 (i.e., corresponding to 8 and 4 EREGs, respectively), depending on the subframe type, i.e., it may be time-varying. Depending on the radio link conditions, an EPDCCH may be transmitted on a set of ECCEs, e.g., 1, 2, 4, 8, 16 or 32 ECCEs, located either within one or a few PRB pairs (i.e., localized transmission), or on all PRB pairs of the EPDDCH set (i.e., distributed transmission). The more ECCEs (or EREGs) that are used to transmit the EPDCCH, the more robust the control channel transmission becomes since a lower code rate could be utilized. The ECCEs are enumerated per each EPDCCH set. The EPDCCH also supports Multi-User Multiple Input Multiple Output (MU-MIMO), such that several EPDCCHs could be transmitted on the same set of ECCEs using different antenna ports.

For localized transmission, an EPDCCH would occupy all EREGs associated with the ECCEs designated for its transmission. However, for distributed transmission, an EPDCCH may not utilize all EREGs of an ECCE in a PRB since it may be transmitted over several PRB pairs and use only a few EREGs per PRB pair. For example, distributed transmission may use 4 EREGs from 4 different PRB pairs (1 EREG per PRB pair), instead of 4 EREGs corresponding to 1 ECCE in 1 PRB pair for localized transmission.

For TDD, the frame structure comprises, in addition to normal subframes, special subframes which contain a first part for downlink transmissions; Downlink Pilot Time Slot (DwPTS), a second part for Guard Period (GP) and last part for uplink transmissions; Uplink Pilot Time Slot (UpPTS), see FIG. 2A. The duration of the different parts may vary and may be configurable by the system.

A downlink subframe is illustrated in FIG. 2B and an uplink subframe is illustrated FIG. 2C.

Moreover, in the LTE system, there is a downlink control region where control channels (e.g., PDCCH) may be transmitted in the 3 (or 4, for small system bandwidths) first OFDM symbols of the subframe, see FIG. 2B. In the special subframes for TDD, the downlink control region is shorter than in normal subframes.

TDD is an attractive multiplexing method as it allows flexible allocation of the resources to uplink or downlink, depending on deployment scenario and traffic load. The EPDCCH has several attractive features that makes it useful in terms of downlink inter-cell interference coordination and beamforming. It would therefore be an advantage if the system could operate with the EPDCCH and in TDD mode. However, it must then be assured that efficient HARQ feedback can be arranged; otherwise the overhead in the uplink control channel will be a significant drawback.

Hence, it is a general problem to assure that there is a reasonable trade-off between control channel overhead and performance.

SUMMARY OF INVENTION

It is therefore an object to obviate at least some of the above mentioned disadvantages and to improve the performance in a wireless communication system.

According to a first aspect, the object is achieved by a method in a radio network node, for assignment of uplink control channel resources for providing HARQ feedback for data transmitted on a downlink data channel associated with a downlink control channel. The downlink control channel comprises at least a set of downlink control channel resources, which is configurable over a subset of available time frequency resources. The method comprises dividing the set of downlink control channel resources into at least two subsets of references, comprising indices to the respective downlink control channel resources. Also, the method comprises defining, for each such subset of references, an associated subset of references comprising indices to unique uplink control channel resources. Furthermore, the method comprises associating each element in the subset of references with a subframe and an element in the subset of references. Additionally, the method further comprises transmitting data on the downlink data channel associated with the downlink control channel.

According to a second aspect, the object is achieved by a radio network node, for assignment of uplink control channel resources for providing HARQ feedback for data transmitted on a downlink data channel associated with a downlink control channel. The downlink control channel comprises at least a set of downlink control channel resources, which is configurable over a subset of available time frequency resources. The radio network node comprises a processing circuit. The processing circuit is configured for dividing the set of downlink control channel resources into at least two subsets of references, comprising indices to the respective downlink control channel resources. The processing circuit is further configured for defining, for each such subset of references, an associated subset of references comprising indices to unique uplink control channel resources. In addition, the processing circuit is configured for associating each element in the subset of references with a subframe and an element in the subset of references, comprising indices to the respective downlink control channel resources. The radio network node also comprises a transmitting unit, configured for transmitting data on the downlink data channel associated with the downlink control channel.

According to a third aspect, the object is achieved by a method in a receiver. The receiver is configured for providing HARQ feedback for data transmitted on a downlink data channel associated with a downlink control channel. The downlink control channel comprises at least a set of downlink control channel resources, which is configurable over a subset of available time frequency resources. The method comprises receiving data on subframes on the downlink data channel associated with the downlink control channel, and an associated subset of references to unique uplink control channel resources from a radio network node. Further, the method comprises determining, for each of the received subframes, whether the data has been correctly received. In addition, the method comprises encoding a HARQ feedback comprising an acknowledgement (ACK) for each correctly received subframe of data, and a negative acknowledgement (NACK) for each incorrectly received subframe of data on the uplink control channel resources according to the received subset of references. Furthermore, in addition, the method comprises transmitting the encoded HARQ feedback, to be received by the radio network node.

According to a fourth aspect, the object is achieved by a receiver. The receiver is configured for providing HARQ feedback for data transmitted on a downlink data channel associated with a downlink control channel. The downlink control channel comprises at least a set of downlink control channel resources, which is configurable over a subset of available time frequency resources. The receiver comprises a receiving unit, configured for receiving data on subframes on the downlink data channel associated with the downlink control channel, and also configured for receiving an associated subset of references to unique uplink control channel resources from a radio network node. Further, the receiver comprises a processing circuit, configured for determining, for each of the received subframes, whether the data has been correctly received. Also, the processing circuit is further configured for encoding a HARQ feed-back comprising an acknowledgement (ACK) for each correctly received subframe of data, and a negative acknowledgement (NACK) for each incorrectly received subframe of data on the uplink control channel resources according to the received subset of references. Additionally, the receiver also comprises a transmitting unit, configured for transmitting the encoded HARQ feed-back, to be received by the radio network node.

Embodiments of the invention may be applicable to assignment of uplink transmission resources, wherein at least one part of the assignment may be made from an implicit association to a downlink channel. Such a downlink channel may also comprise a data channel. The implicit association may correspond to at least one time-frequency resource used by said downlink channel.

Some embodiments of the invention is applicable for systems where multiple uplink transmission resources need to be assigned, e.g., in TDD systems. Some embodiments are applicable to HARQ feedback by use of channel selection.

Furthermore, some embodiments of the invention are applicable for resource allocations which in part are based by implicit reservations. For example additional receiver-specific offsets, cell-specific offsets and implicit relations to antenna ports may also be comprised.

Some advantages according to embodiments herein comprises that network performance is enhanced while maintaining low uplink control channel overhead, as less uplink control channel resources are allocated. Thereby, uplink resources that otherwise would have to be allocated for control channel resources, instead may be utilised for transmitting uplink data, i.e. by allocating the corresponding bandwidth for an uplink data channel. Thus an improved performance within a wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which:

FIG. 2A is a block diagram illustrating subframes in TDD according to prior art.

FIG. 2B is a block diagram illustrating a downlink subframe in TDD according to prior art.

FIG. 2C is a block diagram illustrating an uplink subframe in TDD according to prior art.

DETAILED DESCRIPTION OF INVENTION

Embodiments of the invention described herein are defined as a radio network node, a method in a radio network node, a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
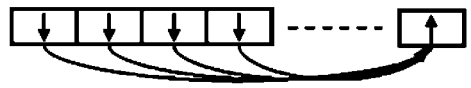
FIG. 1A is a block diagram illustrating subframes in TDD according to prior art.
Figure 1B:
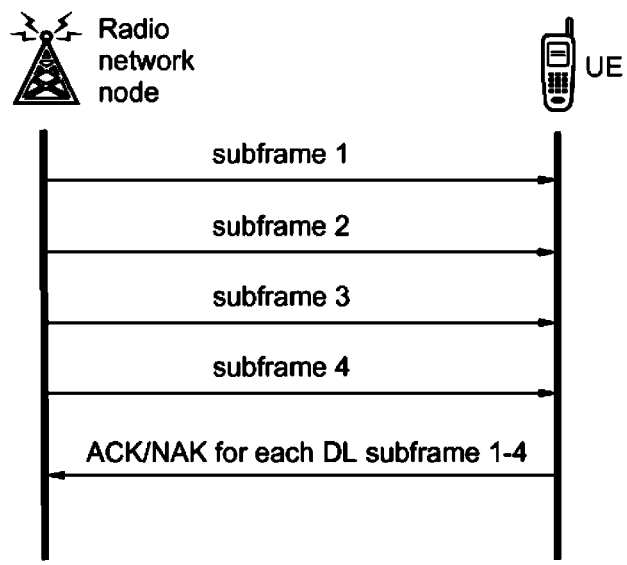
FIG. 1B is a combined block diagram and signalling scheme illustrating downlink and uplink signalling according to prior art.
Figure 3:
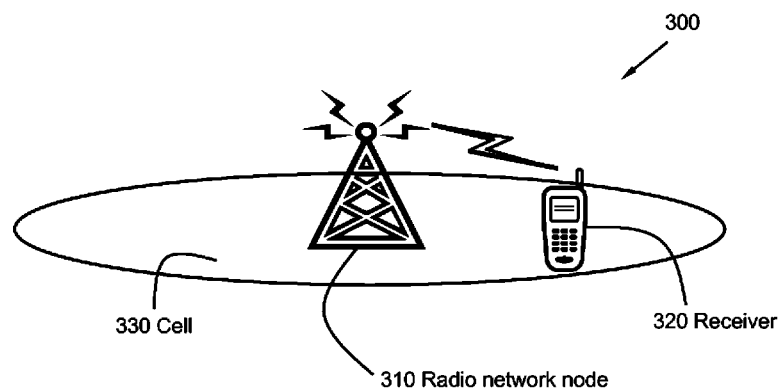
FIG. 3 is a block diagram illustrating an embodiment of the invention.

FIG. 3 is a schematic illustration over a wireless communication system 300. The wireless communication system 300 may at least partly be based on radio access technologies such as e.g. 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1× RTT and High Rate Packet Data (HRPD), just to mention some few options.

The wireless communication system 300 may be configured to operate according to the TDD principle, according to some embodiments.

TDD is an application of time-division multiplexing to separate uplink and downlink signals in time, possibly with a Guard Period situated in the time domain between the uplink and downlink signalling, as have previously been discussed.

The purpose of the illustration in FIG. 3 is to provide a simplified, general overview of the methods and nodes, such as radio network node and receiver herein described, and the functionalities involved. The methods, radio network node and receiver will subsequently, as a non-limiting example, be described in a 3GPP/LTE environment, but the embodiments of the disclosed methods, radio network node and receiver may operate in a wireless communication system 300 based on another access technology such as e.g. any of the above enumerated. Thus, although the embodiments of the invention are described based on, and using the lingo of, 3GPP LTE systems, it is by no means limited to 3GPP LTE.

The illustrated wireless communication system 300 comprises a radio network node 310 and a receiver 320, which radio network node 310 is serving a cell 330.

The radio network node 310 controls the radio resource management within the cell 330, such as e.g. allocating radio resources to the receiver 320 within the cell 330 and ensuring reliable wireless communication between the radio network node 310 and the receiver 320. The radio network node 310 may typically comprise an eNodeB, e.g. in an LTE-related wireless communication system 300.

The receiver 320 is configured to transmit radio signals comprising information to be received by the radio network node 310. Correspondingly, the receiver 320 is configured to receive radio signals comprising information transmitted by the radio network node 310.

The illustrated network setting of one receiver 320 and one radio network node 310 in FIG. 3 is to be regarded as a non-limiting example of an embodiment only. The wireless communication system 300 may comprise any other number and/or combination of radio network nodes 310 and/or receiver/s 320, although only one instance of a receiver 320 and a radio network node 310, respectively, are illustrated in FIG. 3, for clarity reasons. A plurality of receivers 320 and radio network nodes 310 may further be involved in some embodiments of the disclosed invention.

Thus whenever "one" or "a/an" receiver 320 and/or radio network node 310 is referred to in the present context, a plurality of receivers 320 and/or radio network nodes 310 may be involved, according to some embodiments.

The receiver 320 may be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 310, according to different embodiments and different vocabulary.

The radio network node 310 may according to some embodiments be referred to as e.g. base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 110 over a wireless interface, depending e.g. of the radio access technology and terminology used.

In the sequel, the terminology from the 3GPP LTE system (EPDCCH, ECCE, subframe, etc.) may occasionally be used but a skilled reader may interchangeably consider more general notions of channels and signals with the same functionality and properties.

Consider an uplink subframe which is associated with HARQ signalling for M downlink subframes, e.g., M=1,2, 3,4. Furthermore, assume that there are N time-frequency resources on which a downlink control channel, associated with the data transmission for which HARQ feedback should be provided, could be transmitted. It is noted that there may be constraints on which of the N resources the EPDCCH could be transmitted. This could depend on, e.g., how the N resources are shared between different receivers 320, the size of the EPDCCH set or the number of resources used for transmitting an EPDCCH. Nevertheless, we may assume that there are N resources and the downlink control channel may be transmitted on one or several of the N resources. For example, the downlink control channel may be the EPDCCH and the time-frequency resource may be one (or several) ECCE(s), e.g., used for a localized transmission of said downlink control channel. The N time-frequency resources (e.g., ECCEs) may represent the ECCEs in an EPDCCH set. Alternatively, for a distributed transmission of said downlink control channel, the time-frequency resource could be comprised of resources (e.g., EREGs) from several ECCEs and PRB pairs. Hence, the N time-frequency resources may also represent sets of aggregated EREGs for distributed transmission in an EPDCCH set, or even just the EREGs in the EPDCCH set. The N ECCEs may represent the ECCEs in an EPDCCH set. In particular, embodiments herein consider the case where the transmitter may control (e.g., configure) the time-frequency location of the N resources. It is noted that such a configuration may encompass either a fixed frequency position but a configurable time position, or a fixed time position but a configurable frequency position, or both a configurable time-and frequency position. A frequency position could be characterized by a set of PRB pairs. A time position could be characterized by a set of subframes. For example, the N resources may be confined to certain parts of the carrier bandwidth, e.g., in some PRB pairs. This would apply if the N resources are defined from a configurable EPDCCH set.

Furthermore, the invention is also applicable for a case where the network node 310 has at least configured the time-frequency locations of a first set of N downlink resources, while also providing a second set of N downlink resources whose time-frequency positions are not configurable but known to the receiver 320 in advance. A skilled person may consider applying the embodiments and characterizing features of the invention also when there is only a set of N downlink resources whose time-frequency positions are not configurable but known to the receiver 320 in advance. An example of using pre-determined time-frequency resources is to convey downlink control channels to all receivers 320 in the cell, e.g., by means of a so called common search space in the LTE system.

Considering the EPDCCH, for a given EPDCCH set, the value of N is a function of the number of PRB pairs in the EPDCCH set and the number of ECCEs per PRB pair. In one example, N may be calculated based on the maximum value of ECCEs per PRB pair supported by the system 300.

It is an objective of the invention according to some embodiments, to assure that M·N unique uplink resources may be allocated. A non-limiting assumption is that the uplink resources are indexed as m=0,1, . . . , M·N−1. Furthermore, in the following examples, the amount of reserved uplink time-frequency resources for HARQ feedback is a non-decreasing function of the index m. Therefore, if in any instance, resource $m=m_0$ is utilised, the radio network node 310 has to reserve time-frequency resource (e.g., PRB pairs) corresponding to resources $m<m_0$, even if these are not utilised. It is assumed that the downlink control channel time-frequency resources are indexed as n=0, 1, . . . , N−1 and the subframes are indexed as j=0,1, . . . , M−1. A skilled reader may consider altering the indexing while fulfilling the characterizing features of the invention. It is assumed that the uplink resource for a HARQ message is at least partially determined by an implicit mapping from one or several time-frequency resources n occupied by the associated downlink control channel. For example additional receiver-specific offsets, cell-specific offsets and implicit relations to antenna ports may also be considered. In the following the implicit mapping is further considered. The notion of index may be interchangeably used for any of uplink or downlink resource. A further objective of the invention in some embodiments is to minimize the amount of assigned uplink resources.

In some embodiments, the method first comprises dividing the N downlink time-frequency resource indices into $N_s$ disjoint subsets, $\Phi_i, 0 \leq i \leq N_s-1$, where $1 < N_s \leq N$. In one embodiment, the size of the subsets, $|\Phi_i|$, is the same for all subsets. Another example may be where all but one subset have the same size. In particular, it may be realised in some embodiments that the subset may be arranged to comprise resource indices corresponding to an integer number of PRB pairs, e.g., 1 or 2 PRB pairs, which will provide uplink resource savings. In one embodiment, the elements in a subset comprise consecutive resource indices. It is also clear to a skilled person that depending on how the different resource indices are mapped to different PRB pairs, arranging the subset to include indices associated with resources in, e.g., 1 or 2 PRB pairs does not require the subset to comprise consecutive indices. Each set $\Phi_i, 0 \leq i \leq N_s-1$ is associated with a set of uplink resource indices $\Omega_i, 0 \leq i \leq N_s-1$ comprising $M \cdot |\Phi_i|$ unique uplink resource indices. The $\Omega_i, 0 \leq i \leq N_s-1$ sets are disjoint. In a further step of some embodiments of the method, the $M \cdot |\Phi_i|$ uplink resource indices may be assigned to the M subframes for each index in the associated set $\Phi_i, 0 \leq i \leq N_s-1$.

Figure 4A:
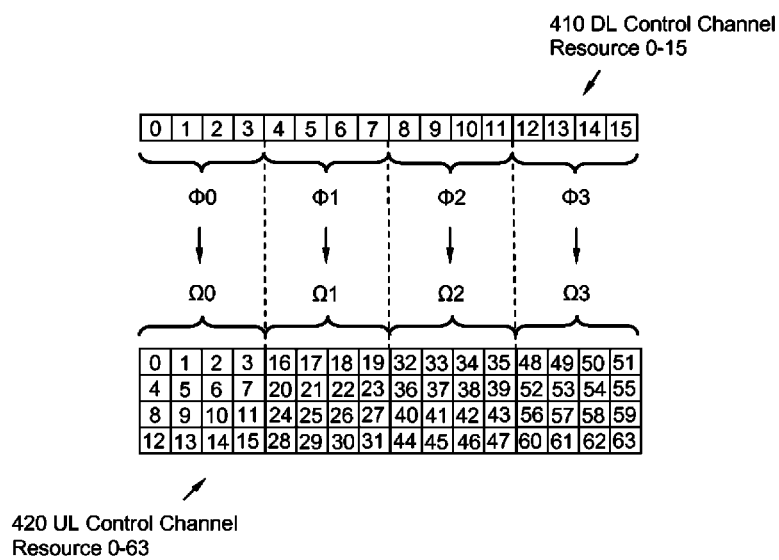
FIG. 4A is a block diagram illustrating an embodiment of the invention.

In one embodiment, each set $\Omega_i, 0 \leq i \leq N_s-1$ contains contiguous resource indices. The following is an example of this embodiment. Let $$\Phi_i = \left\{ n : \left\lfloor \frac{n}{K} \right\rfloor = i \right\},$$
$$0 \leq i \leq N_s - 1$$

where K is a positive number or integer and $\lfloor \cdot \rfloor$ is the floor operator. Hence, in this example, this subset comprises consecutive indices. Furthermore, let the associated set of contiguous uplink resource indices be $\Omega_i = \{m: i \cdot K \cdot M \leq m \leq K \cdot M - 1 + i \cdot K \cdot M\}, 0 \leq i \leq N_s-1$. The elements in the set may be ordered, e.g. in an increasing or decreasing order. In one embodiment, the uplink resource indices are then assigned in an increasing order of n and then an increasing order of j for each set $\Phi_i, 0 \leq i \leq N_s-1$. Table 1 shows an example of this allocation for $N=16, N_s=4, M=4$ and $K=4$. This gives the following realisations of the sets of integers, where the elements are assumed to be in an increasing order:

$\Phi_0 = \{n:0 \leq n \leq 3\}, \Phi_1 = \{n:4 \leq n \leq 7\}, \Phi_2 = \{n:8 \leq n \leq 11\},$
$\Phi_3 = \{n:12 \leq n \leq 15\}$ $\Omega_0 = \{m:0 \leq m \leq 15\}, \Omega_1 = \{m:16 \leq m \leq 31\},$ $\Omega_2 = \{m:32 \leq m \leq 47\}, \Omega_3 = \{m:48 \leq m \leq 63\}$ FIG. 4A is illustrating the allocation described above and exemplified in Table 1.

It is realised that the assignment of the method provides an advantage in allowing uplink resource savings by that the radio network node 310 may choose to schedule the associated downlink control channel on only a subset of the N resource indices in all subframes. For example, consider that K=4 ECCEs are available per PRB pair, then the resources of $\Phi_i$ correspond to the 4 ECCEs in 1 PRB pair. If the radio network node 310 confines its scheduling of the downlink control channel to the time-frequency resources corresponding to $\Phi_0$ in all subframes, it would suffice to reserve 16 (0-15) uplink resources (instead of 64 resources). Only in the case where the radio network node 310 transmits the downlink control channel on n=63 in subframe j=3 are 64 resources needed. If the radio network node 310 schedules on any of the first and second PRB pair (i.e., on resources n=0-7), only 31 resources may be needed. An advantage of the invention is therefore that it allows uplink resource savings at the discretion of the radio network node 310 by means of scheduling the downlink control channel. In particular such savings are obtained in one embodiment where the size of the subsets, $|\Phi_i|$ corresponds to the maximum number of downlink time-frequency resources in a PRB pair, e.g., 4.

It is to be noted that the illustrated example in FIG. 4A merely is an arbitrary example of an embodiment. The illustrated example of four subframes of time-frequency resources $\Phi_0, \Phi_1, \Phi_2, \Phi_3$ is merely an illustrative example. Other numbers of subframes of time-frequency resources $\Phi_0, \Phi_1, \Phi_2, \Phi_3$ may be utilised in other embodiments of the invention. Such uplink resource overhead savings are not available in prior art, since the associated control channel, PDCCH, is transmitted over a large bandwidth and its time-frequency resources are not configurable in terms of PRB pairs.

TABLE 1

Example for N = 16, $N_s$ = 4, M = 4, K = 4 and the uplink resource indices are assigned in an increasing order of n and then an increasing order of j for each set $\Phi_i, 0 \leq i \leq N_s - 1$.

| | | | | | | | | | n | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 1 | 2 | 3 | 16 | 17 | 18 | 19 | 32 | 33 | 34 | 35 | 48 | 49 | 50 | 51 |
| 1 | 4 | 5 | 6 | 7 | 20 | 21 | 22 | 23 | 36 | 37 | 38 | 39 | 52 | 53 | 54 | 55 |
| 2 | 8 | 9 | 10 | 11 | 24 | 25 | 26 | 27 | 40 | 41 | 42 | 43 | 56 | 57 | 58 | 59 |
| 3 | 12 | 13 | 14 | 15 | 28 | 29 | 30 | 31 | 44 | 45 | 46 | 47 | 60 | 61 | 62 | 63 |

The resource allocation of Table 1 may alternatively be represented in a shorter form such as $m=(M-j-1)\cdot N_c + j\cdot N_{c+1}+n$ where $N_c=K\cdot c$ and c is chosen such that $N_c \leq n < N_{c+1}$ for $c=\{0, \ldots, N_s-1\}$.

It is realised that the method also may provide uplink resource savings when the associated downlink control channel is transmitted in a distributed manner. In that case, the resource n is composed of resources (e.g., EREGs) from different PRB pairs. By transmitting the distributed downlink control channel on resources with small indices n, it is evident that few uplink resources will be reserved. For example, if the downlink control channel is transmitted in all PRB pairs of the EPDCCH, it will be possible to implicitly reserve uplink resources from the EREGs (or ECCEs) in the one of the PRB pairs (e.g., the first PRB pair) of the EPDCCH. Hence, it is evident that the embodiment illustrated by Table 1 also provides resource savings.

Figure 4B:
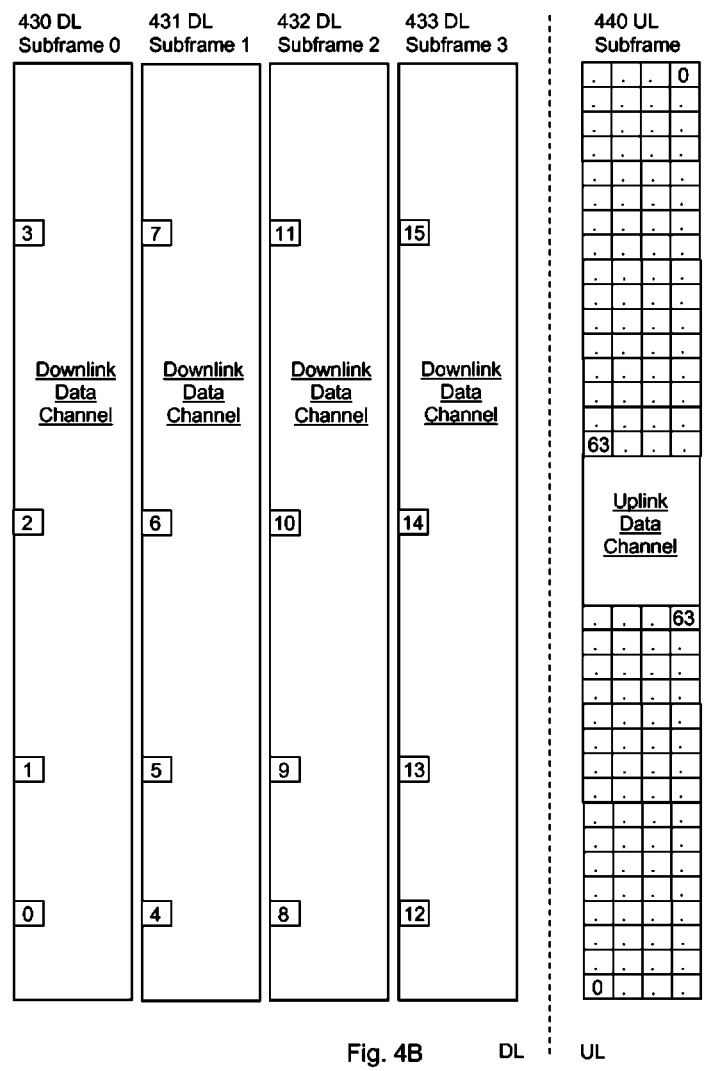
FIG. 4B is a block diagram illustrating an embodiment of the invention.

FIG. 4B is yet an illustration, depicting an example according to an embodiment of the invention. In the illustrated embodiment, there are four downlink subframes 430, 431, 432, 433 and an uplink subframe 440. The four downlink subframes 430, 431, 432, 433 each comprises four control channel resources marked with numbers from 0-15, and downlink data channel. The uplink subframe 440 comprises an uplink data channel and uplink control channel resources, marked 0, . . . , 63. It is to be noted that the illustrated example in FIG. 4B merely is an arbitrary example of an embodiment. The positions of resources may be different in different embodiments of the invention. By providing HARQ feedback on uplink resources with low indices, less control channel resources has to be allocated for providing feedback and the corresponding bandwidth may instead be utilised for uplink data transmission.

In a further embodiment, the uplink resource indices are assigned in an increasing order of j and then an increasing order of n for each set $\Phi_i, 0\leq i\leq N_s-1$. This is exemplified in Table 2 using the same parameters and sets as for Table 1. As may be seen, this embodiment may reduce the uplink resources even more, e.g., if the radio network node 310 is able to transmit the associated downlink control channel on resource index n=0 in all subframes, only 4 (0-3) resources may be needed. Hence, compared to Table 1, this embodiment provides resource savings in cases where multiple subframes are utilised if scheduling may be performed on particular (i.e., low n indices) resources. Similar to Table 1, only 16 (0-15) resources will be needed if the downlink control channel is confined to the first PRB pair for all subframes.

TABLE 2

Example for N = 16, $N_s$ = 4, M = 4, K = 4 and the uplink resource indices are assigned in an increasing order of j and then an increasing order of n for each set $\Phi_i, 0 \leq i \leq N_s - 1$.

| | n | | | | | | | | | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 4 | 8 | 12 | 16 | 20 | 24 | 28 | 32 | 36 | 40 | 44 | 48 | 52 | 56 | 60 |
| 1 | 1 | 5 | 9 | 13 | 17 | 21 | 25 | 29 | 33 | 37 | 41 | 45 | 49 | 53 | 57 | 61 |
| 2 | 2 | 6 | 10 | 14 | 18 | 22 | 26 | 30 | 34 | 38 | 42 | 46 | 50 | 54 | 58 | 62 |
| 3 | 3 | 7 | 11 | 15 | 19 | 23 | 27 | 31 | 35 | 39 | 43 | 47 | 51 | 55 | 59 | 63 |

The resource allocation of Table 2 may alternatively be represented in a shorter form such as: $m=M\cdot n+j$.

In one embodiment, each set $$\Omega_i = \bigcup_{k=0}^{M-1} \tilde{\Omega}_{ki},$$

$$0 \leq i \leq N_s - 1$$

is the union of M disjoint subsets, $\tilde{\Omega}_{ki}, 0\leq k\leq M$, where each subset contains contiguous resource indices. One example of a subset is $\tilde{\Omega}_{ki}=\{m:N\cdot k+K\cdot i\leq m\leq K-1+N\cdot k+K\cdot i\}$. In one embodiment, the uplink resource indices are then assigned in an increasing order of n and then an increasing order of j for each set, $\Phi_i, 0\leq i\leq N_s-1$, where the elements in the set are arranged in an increasing order. This is exemplified in Table 2 using the same parameters as for Table 1. For example, this gives $\tilde{\Omega}_{00}=\{m:0\leq m\leq 3\}, \tilde{\Omega}_{10}=\{m:16\leq m\leq 19\}$, $\tilde{\Omega}_{20}=\{m:32\leq m\leq 35\}, \tilde{\Omega}_{30}=\{m:48\leq m\leq 51\}$

TABLE 3

Example for N = 16, $N_s$ = 4, M = 4, K = 4 and the uplink resource indices are assigned in an increasing order of n and then an increasing order of j for each set $\Phi_i, 0 \leq i \leq N_s - 1$.

| | n | | | | | | | | | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |

TABLE 3-continued

Example for N = 16, $N_s$ = 4, M = 4, K = 4 and the uplink resource indices are assigned in an increasing order of n and then an increasing order of j for each set $\Phi_i$, $0 \le i \le N_s - 1$.

| | | | | | | | | n | | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |

The resource allocation of Table 3 may alternatively be represented in a shorter form such as: m=n+N·j, or $$m = n + \sum_{k=0}^{j-1} N_k,$$

where $N_k$ is the number of uplink control channel resources in subframe k (e.g., the number of ECCEs of an EPDCCH set in subframe k).

It is realised that this arrangement may provide uplink resource overhead savings if the radio network node 310 is able to transmit the downlink control channel in subframes with low indices j. For example, if it is transmitted only at any index n but only in subframe j=0, at most 16 (0-15) uplink resources need to be reserved.

It is noted that in the above embodiments, for a given subframe j and a given subset $\Phi_i, 0 \le i \le N_s-1$, the resource index m is an increasing function of n. This is advantageous considering that the downlink control channel may be transmitted on several resources, and the implicit relation may be to utilise only one index, e.g., the index of the first downlink resource where the downlink control channel is transmitted. Hence, uplink resource savings may be achieved when m is an increasing function of n. For example, in Table 2 for subframe j=0, the resources m corresponding to $\Phi_3=\{12, 13,14,15\}$ are $\{48,52,56,60\}$. Thus if the downlink control channel occupies all resources in $\Phi_3$, the allocated uplink resource is m=48. If the resource would instead be ordered as $\{60,56,52,48\}$, it would imply that m=60, i.e., more resources are needed.

It is noted that the method disclosed herein is not limited to implicit resource reservation from a first index associated with the downlink control channel. For example, if Multi User MIMO (MU-MIMO) is used, i.e., several receivers/UEs 320 transmit an EPDCCH on the same uplink resource on different antenna ports, a resource reservation may also be made from other than the first resource associated with the downlink control channel and possibly also be dependent on the antenna port.

The invention is also applicable to uplink resource savings when the receiver 320 is configured with multiple sets of downlink resources. This may be realised by that the set $\Phi_i, 0 \le i \le N_s-1$ does not contain a set of contiguous resource indices. For example consider that 2 sets with resources for the associated downlink control channel are configured (e.g., 2 EPDCCH sets) and the first set corresponds to indices n=0,1, . . . , N−1 and the second set corresponds to indices n'=0,1, . . . , N'−1. Table 4 and 5 show an example of this allocation for N=N'=16,$N_s$=4,M=4 and K=4.

TABLE 4

Example for N = 16, $N_s$ = 4, M = 4, K = 4 and the uplink resource indices are assigned in an increasing order of n and then an increasing order of j for each set $\Phi_i$, $0 \le i \le N_s - 1$.

| | | | | | | | | n | | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 0 | 1 | 2 | 3 | 32 | 33 | 34 | 35 | 64 | 65 | 66 | 67 | 96 | 97 | 98 | 99 |
| 1 | 4 | 5 | 6 | 7 | 36 | 37 | 38 | 39 | 68 | 69 | 70 | 71 | 100 | 101 | 102 | 103 |
| 2 | 8 | 9 | 10 | 11 | 40 | 41 | 42 | 43 | 72 | 73 | 74 | 75 | 104 | 105 | 106 | 107 |
| 3 | 12 | 13 | 14 | 15 | 44 | 45 | 46 | 47 | 76 | 77 | 78 | 79 | 108 | 109 | 110 | 111 |

TABLE 5

Example for N' = 16, $N_s$ = 4, M = 4, K = 4 and the uplink resource indices are assigned in an increasing order of n' and then an increasing order of j for each set $\Phi_i$, $0 \le i \le N_s - 1$.

| | | | | | | | | n' | | | | | | | | |
|---|---|---|---|---|---|---|---|---|---|---|---|---|---|---|---|---|
| j | 0 | 1 | 2 | 3 | 4 | 5 | 6 | 7 | 8 | 9 | 10 | 11 | 12 | 13 | 14 | 15 |
| 0 | 16 | 17 | 18 | 19 | 48 | 49 | 50 | 51 | 80 | 81 | 82 | 83 | 112 | 113 | 114 | 115 |
| 1 | 20 | 21 | 22 | 23 | 52 | 53 | 54 | 55 | 84 | 85 | 86 | 87 | 116 | 117 | 118 | 119 |
| 2 | 24 | 25 | 26 | 27 | 56 | 57 | 58 | 59 | 88 | 89 | 90 | 91 | 120 | 121 | 122 | 123 |
| 3 | 28 | 29 | 30 | 31 | 60 | 61 | 62 | 63 | 92 | 93 | 94 | 95 | 124 | 125 | 126 | 127 |

It is realised that this allows the transmitter to utilise n=0,1,2,3 and n'=0,1,2,3 with reserving only resources 0 to 31. Hence, it would allow utilising also the second set of resources (n'=0-15) while reducing the number of uplink resources. Since the resources in the second set may be associated with another set of PRB pairs, the channel quality may be significantly different compared to the first set. Hence, the radio network node 310 may gain from using the most favourable set without necessarily requiring significant amount of uplink resources.

It is further realized, that the aforementioned usage of additional receiver-specific offsets could also be applied to separate uplink resources associated with different EPDCCH sets. For example, by properly assigning different offsets to different EPDCCH sets, the related sets of uplink resources could be made disjoint.

In addition, some embodiments of the invention comprise an explicit resource indicator. Such an indicator may be conveyed, e.g., in the associated downlink control channel either by dedicated bits or by reusing other unused information fields. For example, 2 bits may convey 4 values of the resource indicator. One embodiment comprises using the resource indicator to select a value j and assign the associated resource for index n. With the resource indicator, the used resource would be m=n+N·r. As an example, consider Table 3 and assume the resource indicator may assume the values r=0,1,2,3. One consequence of Table 3 is that resource savings may not be possible when the radio network node 310 has to transmit the downlink control channel in subframes with large indices j. If the downlink control channel is transmitted in subframe j=3 and on resource n=15, uplink resource 63 may be used and in total 64 resources need to be reserved according to Table 3. If, however, downlink resource n=15 was not utilised by any receiver 320 in subframe j=0, the resource indicator may be used to assign uplink resource m=15 by signalling r=0. If m=15 was already utilised, the value r=1 may be signalled and uplink resource m=31 would be used etc.

A skilled reader may use the alternative representation $$m = n + \sum_{k=0}^{j-1} N_k + r \quad (1)$$

where $N_k$ is the number of uplink control channel resources in subframe k (e.g., the number of ECCEs of an EPDCCH set in subframe k) and r is the resource indicator. It is realized that by using the resource indicator values $r \in \{0,-N_0,-N_0,-N_1,-N_0-N_1-N_2\}$ terms in the sum of (1) could be cancelled and it would be possible to choose uplink resources of a certain subframe j, when $N_0=N_1=N_2=N$. The objective is therefore equivalently achieved by using (1) and (2), or, by using m=n+N·r and r={0,1,2,3}.

One embodiment comprises associating a subset of the resource indicator states with a set of negative values. In one example, at least one of the negative values are obtained as a linear combination of one or several of the values $N_k$ being the number of uplink control channel resources in subframe k. That is, a resource indicator value may be $$r = -\sum_{k=0}^{M-1} \alpha_k N_k$$

for $\alpha_k$ being real-valued numbers. For example, using 2 negative values, $r \in \{0,2,-N_0-N_1,-N_0-N_1-N_2\}$ may allow adjusting the uplink resource by the positive value '2', which is beneficial in order to avoid any resource collisions that may occur in a given subframe (e.g., due to Multi User MIMO (MU-MIMO), wherein a downlink control channel resource is used by multiple users), or accommodating adjusting selection of resources from a subframe j, by utilizing any of the two negative values.

It is further realized that the resource indicator values may be optimized for each subframe j. For example, if j=0, a set of large negative indicator values may not be needed, since the resource would simply be m=n+r according to (1). Hence, a set of values, e.g., $r(j=0) \in \{0,2,-2,-1\}$ may be more efficient. On the other hand, for subframe j=3, it would be beneficial to have a set of large negative values in order to cancel terms in the sum of (1), e.g., $r(j=3) \in \{0,2,-N_0-N_1,-N_0-N_1-N_2\}$. Hence, one embodiment includes using resource indicator values r(j) which are dependent on the subframe number j.

Furthermore, in the prior art LTE system, the number of downlink and uplink subframes in a radio frame is configurable. For certain configurations, the number of downlink subframes, M, being associated with an uplink subframe may differ for different uplink subframes. It is realized in this invention that the resource indicator values may be optimized for each value of M. For example, if M=2, using $r=\{0,2,-2,-N_0\}$ or $r=\{0,2,-1,-N_0\}$ may offer better resource utilization by having the ability to use a set of small values as well as one larger negative value (i.e., $r=-N_0$). Hence, one embodiment includes using resource indicator values r(M) which are dependent on the number of associated downlink subframes, M, for the given uplink subframe.

The skilled reader may combine any of the above embodiments for resource indicator values being dependent on both subframe j and downlink subframe association M, r(j,M).

In one embodiment, 2 of the resource indicator states are given by a set of negative values. In one example, at least one of the negative values are obtained as a linear combination of one or several of the values $N_k$ being the number of uplink control channel resources in subframe k.

In one embodiment, 1 of the resource indicator states is given by a negative value. In one example, the negative value is obtained as a linear combination of one or several of the values $N_k$ being the number of uplink control channel resources in subframe k.

In the following, particular examples of negative resource indicator values applicable to the embodiments comprising at least one value obtained as a linear combination of one or several of the values $N_k$ being the number of uplink control channel resources in subframe k is given.

In one example $$r(j) = -\sum_{k=0}^{j-1} N_k,$$

where j is the subframe where EPDCCH is detected.

In one example $r(j)=-N_{j-1}, j>1$, where j is the subframe where EPDCCH is detected.

In one example $$r(p) = -\sum_{k=0}^{p-1} N_k,$$

where p>0 is a value independent of j. One realization is where $P \in \{1,2,\ldots,M\}$, wherein M is the number of subframes configured for EPDCCH for the associated uplink subframe.

Figure 5:
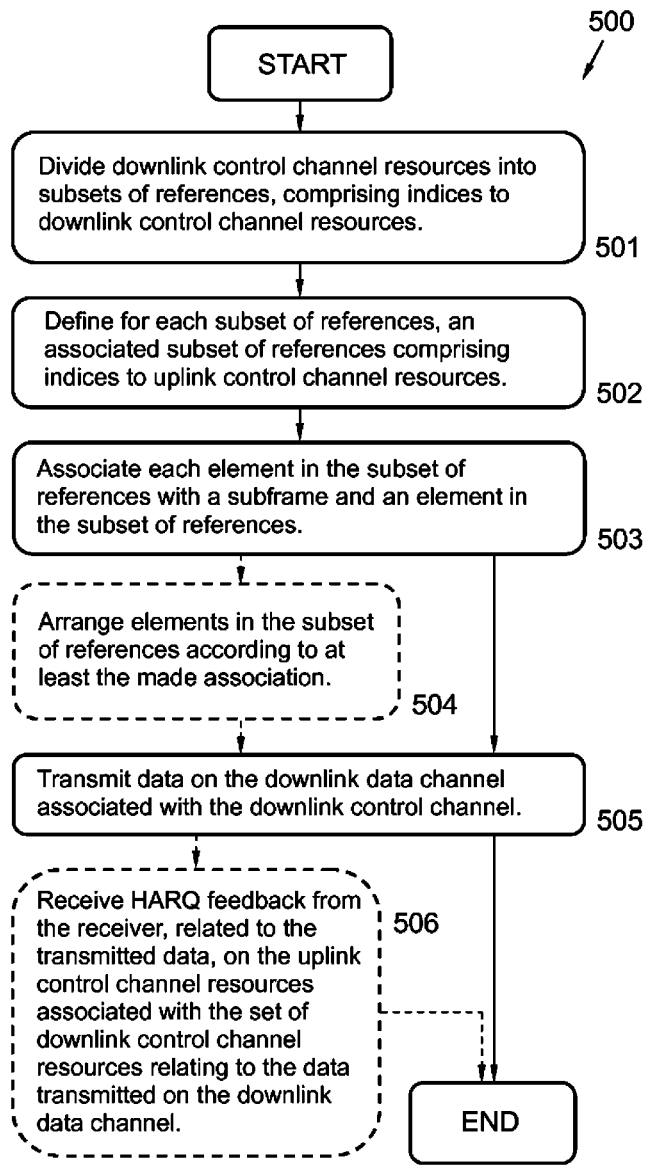
FIG. 5 is a flow chart illustrating a method in a radio network node according to an embodiment of the invention.

FIG. 5 is a flow chart illustrating embodiments of a method 500 for use in a radio network node 310 in a wireless communication system 300. The method 500 aims at assigning uplink control channel resources 420 for providing HARQ feedback for data transmitted on a downlink data channel associated with a downlink control channel. The downlink control channel comprises at least a set of downlink control channel resources 410, which is configurable over a subset of available time frequency resources.

Furthermore, the radio network node 310 may comprise an enhanced NodeB in a Long Term Evolution (LTE) system within the Third Generation Partnership Project (3GPP), the receiver 320 may comprise a User Equipment (UE) the downlink control channel may comprise an Enhanced Physical Downlink Control Channel (EPDCCH) the downlink data channel may comprise a Physical Downlink Shared Channel (PDSCH) the set of downlink control channel resources 410 may correspond to an EPDCCH set which comprises Enhanced Control Channel Elements (ECCEs) and/or Enhanced Resource Element Groups (EREGs) and wherein the subset of available time frequency resources comprises PRB pairs.

The method 500 may be performed in a system based on Time-Division Duplexing (TDD).

The downlink control channel resources 410 may further be utilised for transmission of receiver-specific reference signals in some embodiments.

To appropriately perform the transmission, the method 500 may comprise a number of actions 501-506.

It is however to be noted that any, some or all of the described actions 501-506, may be performed in a somewhat different chronological order than the enumeration indicates, or even be performed simultaneously. Further, it may be noted that some actions are optional and may be performed only according to some alternative embodiments. The method 500 may comprise the following actions:

Action 501

The set of downlink control channel resources 410 are divided into at least two subsets $\Phi_0,\Phi_1,\Phi_2,\Phi_3$ of references, comprising indices to the respective downlink control channel resources 410. The number of subsets $\Phi_0,\Phi_1,\Phi_2,\Phi_3$ may be two, three, . . . , ∞, in different embodiments.

The at least two subsets $\Phi_0,\Phi_1,\Phi_2,\Phi_3$ of references, may comprise indices to the respective downlink control channel resources 410 which may comprise any, some or all of: consecutive indices, subsets $\Phi_0,\Phi_1,\Phi_2,\Phi_3$ of equal sizes, comprises an increasing order of indices, and/or comprises a decreasing order of indices in some embodiments.

The available time-frequency resources may be divided in Physical Resource Block, PRB, pairs mapped against the subsets $\Phi_0,\Phi_1,\Phi_2,\Phi_3$ of references such that at least one subset $\Phi_0,\Phi_1,\Phi_2,\Phi_3$ corresponds to one or more PRB pairs.

Action 502

An associated subset $\Omega_0,\Omega_1,\Omega_2,\Omega_3$ of references comprising indices to unique uplink control channel resources 420 are defined for each such subset $\Phi_0,\Phi_1,\Phi_2,\Phi_3$ of references. The associated subset $\Omega_0,\Omega_1,\Omega_2,\Omega_3$ of references may be one, two, three, . . . , ∞, in different embodiments.

The two subsets $\Omega_0,\Omega_1,\Omega_2,\Omega_3$ of references, comprising indices to the respective uplink control channel resources 420 which may comprise any, some or all of: consecutive indices, subsets $\Omega_0,\Omega_1,\Omega_2,\Omega_3$ of equal sizes, comprises an increasing order of indices, and/or comprises a decreasing order of indices.

Action 503

Each element in the subset $\Omega_0,\Omega_1,\Omega_2,\Omega_3$ of references are associated with a subframe and an element in the subset $\Phi_0,\Phi_1,\Phi_2,\Phi_3$ of references.

The element association may be performed firstly in an increasing order of the number of downlink control channel resources 410 and then in an increasing order of the number of the subframe, within each respective subset $\Phi_0,\Phi_1,\Phi_2,\Phi_3$ of references to downlink control channel resources 410 according to some embodiments.

Further, according to some embodiments, the element association is performed by letting:

$$m=(M-j-1)\cdot N_c+j\cdot N_{c+1}+n$$

wherein: m is an uplink resource index; M is the number of downlink subframes; N is the number of time-frequency resources; j is a subframe index number; n is a downlink resource index and wherein $N_c=K\cdot c$, where c is a non-negative integer chosen such that $N_c\leq n<N_{c+1}$ and K>0.

However, according to some embodiments, the element association is performed by letting:

$$m=n+N\cdot j$$

wherein: m is an uplink resource index; n is a downlink resource index; N is the number of time-frequency resources; j is a subframe index number.

The element association may in some embodiments be performed firstly in an increasing order of the number of the subframe and then in an increasing order of the number of downlink control channel resources 410, within each respective subset $\Phi_0,\Phi_1,\Phi_2,\Phi_3$ of downlink control channel resources 410.

The element association may in some embodiments be performed by letting $$m=M\cdot n+j$$

wherein: m is an uplink resource index; M is the number of downlink subframes; n is a downlink resource index; and j is a subframe index number.

According to some further embodiments, the uplink control channel resources 420 for providing HARQ feedback for data transmitted on a downlink data channel are associated with two sets of downlink control channel resources 410 which are configurable over a subset of available time frequency resources. Furthermore, the method 500 may comprise alternating the element association between the two sets of downlink control channel resources 410.

In some embodiments, the downlink control channel comprises a resource indicator for indicating the association of each element in each set $\Omega_0,\Omega_1,\Omega_2,\Omega_3$ of unique uplink channel resources 420 with a subframe and one element in the set of downlink control channel resources 410.

Action 504

This action may be comprised within some alternative embodiments of the method 500, but not necessarily within all embodiments.

The elements in the subset $\Omega_0,\Omega_1,\Omega_2,\Omega_3$ of references according to at least the made association 503 may be arranged.

Action 505

Data is transmitted on the downlink data channel associated with the downlink control channel.

Action 506

This action may be comprised within some alternative embodiments of the method 500, but not necessarily within all embodiments.

HARQ feedback may be received from the receiver 420, related to the transmitted 505 data, on the unique uplink control channel resources 420 associated 503 with the set of downlink control channel resources 410 relating to the data transmitted 505 on the downlink data channel, in some embodiments.

Figure 6:
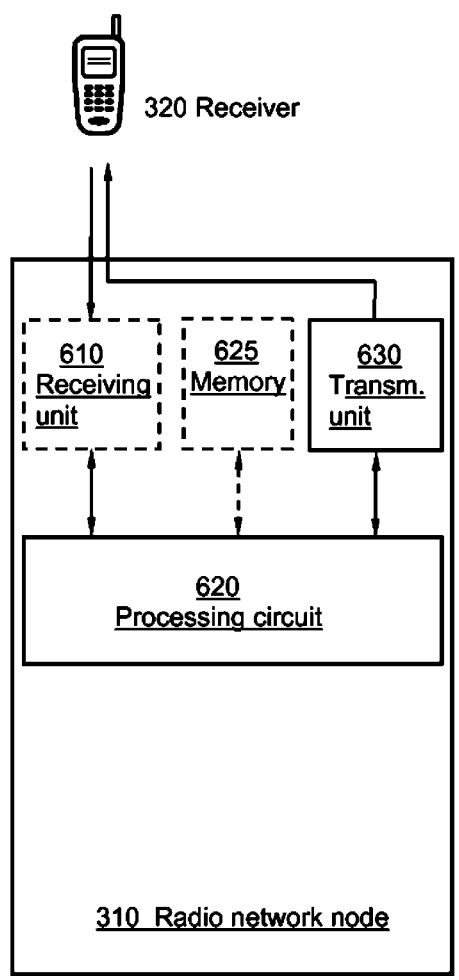
FIG. 6 is a block diagram illustrating a radio network node according to an embodiment of the invention.

FIG. 6 is a block diagram illustrating a radio network node 310 in a wireless communication system 300. The radio network node 310 is configured for assigning uplink control channel resources 420 for providing HARQ feedback for data transmitted on a downlink data channel associated with a downlink control channel. The downlink control channel comprises at least a set of downlink control channel resources 410, which is configurable over a subset of available time frequency resources.

Furthermore, the radio network node 310 may comprise an enhanced NodeB in a Long Term Evolution (LTE) system within the Third Generation Partnership Project (3GPP), the receiver 320 may comprise a User Equipment (UE) the downlink control channel may comprise an Enhanced Physical Downlink Control Channel (EPDCCH) the downlink data channel may comprise a Physical Downlink Shared Channel (PDSCH) the set of downlink control channel resources 410 may correspond to an EPDCCH set which comprises Enhanced Control Channel Elements (ECCEs) and/or Enhanced Resource Element Groups (EREGs) and wherein the subset of available time frequency resources comprises PRB pairs.

The radio network node 310 may in addition be performed in a system based on Time-Division Duplexing (TDD) in some embodiments.

The radio network node 310 is configured to perform the different embodiments of the above described method 500 according to any, some or all of the actions 501-506 for transmitting an information entity.

For enhanced clarity, any internal electronics or other components of the radio network node 310, not completely indispensable for understanding the herein described embodiments has been omitted from FIG. 6.

The radio network node 310 comprises a processing circuit 620, configured for dividing the set of downlink control channel resources 410 into at least two subsets $\Phi_0,\Phi_1,\Phi_2,\Phi_3$ of references, comprising indices to the respective downlink control channel resources 410. Further, the processing circuit 620 is configured for defining, for each such subset $\Phi_0,\Phi_1,\Phi_2,\Phi_3$ of references, an associated subset $\Omega_0,\Omega_1,\Omega_2,\Omega_3$ of references comprising indices to unique uplink control channel resources 420. Additionally, the radio network node 310 is furthermore configured for associating each element in the subset $\Omega_0,\Omega_1,\Omega_2,\Omega_3$ of references with a subframe and an element in the subset $\Phi_0,\Phi_1,\Phi_2,\Phi_3$ of references, comprising indices to the respective downlink control channel resources 410.

The processing circuit 620 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 620 may further perform data processing functions for inputting, outputting, and processing of data comprising data buffering and device control functions, such as call processing control, user interface control, or the like.

The processing circuit 620 may further be configured for performing the element association firstly in an increasing order of the number of downlink control channel resources 410 and then in an increasing order of the number of the subframe, within each respective subset $\Phi_0,\Phi_1,\Phi_2,\Phi_3$ of references to downlink control channel resources 410.

The processing circuit 620 may be further configured for performing the element association by letting $$m=(M-j-1)\cdot N_c+j \cdot N_{c+1}+n$$

wherein: m is an uplink resource index; M is the number of downlink subframes; N is the number of time-frequency resources; j is a subframe index number; n is a downlink resource index; and wherein $$N_c = K \cdot c$$

where c is a non-negative integer chosen such that $N_c \le n < N_{c+1}$ and K>0.

The processing circuit 620 may be further configured for performing the element association by letting $$m=n+N\cdot j$$

wherein: m is an uplink resource index; n is a downlink resource index; N is the number of time-frequency resources; j is a subframe index number.

The processing circuit 620 may be further configured for performing the element association by letting $$m = n + \sum_{k=0}^{j-1} N_k$$

wherein:
m is an uplink resource index;
n is a downlink resource index;
j is a subframe index number;
$N_k$ is the number of uplink control channel resources in subframe.

The processing circuit 620 may be further configured for performing the element association, firstly in an increasing order of the number of the subframe and then in an increasing order of the number of downlink control channel resources 410, within each respective subset $\Phi_0,\Phi_1,\Phi_2,\Phi_3$ of downlink control channel resources 410.

The processing circuit 620 may in further addition be configured for performing the element association by letting $$m=M\cdot n+j$$

wherein: m is an uplink resource index; M is the number of downlink subframes; n is a downlink resource index; j is a subframe index number.

The uplink control channel resources 420 for providing HARQ feedback for data transmitted on a downlink data channel may be associated with two sets of downlink control channel resources 410 which are configurable over a subset of available time frequency resources, and wherein the processing circuit 620 may be further configured for alternating the element association between the two sets of downlink control channel resources 410.

The processing circuit 620 may be further configured for arranging the elements in the subset $\Omega_0,\Omega_1,\Omega_2,\Omega_3$ of references according to at least the made association, in some embodiments.

The downlink control channel resources 410 may be further utilised for transmission of receiver-specific reference signals.

The downlink control channel may comprise a resource indicator for indicating the association of each element in each set $\Omega_0,\Omega_1,\Omega_2,\Omega_3$ of unique uplink channel resources 420 with a subframe and one element in the set of downlink control channel resources 410, according to some embodiments.

The downlink control channel may comprise a resource indicator, wherein at least one value of said resource indicator is used for indicating the association (503) of each element in each set $(\Omega_0,\Omega_1,\Omega_2,\Omega_3)$ of unique uplink channel resources (420) with a subframe and one element in the set of downlink control channel resources (410).

According to some embodiments, resource indicator values can be dependent on the subframe index number and/or the number of downlink subframes associated with the given uplink subframe.

According to some embodiments, resource indicator value r(j) can be $$r(j) = -\sum_{k=0}^{j-1} N_k$$

for at least one j, wherein j is the subframe index number of the downlink control channel comprising the resource indicator, $N_k$ is the number of uplink control channel resources in subframe k.

According to some embodiments, resource indicator value r(p) can be $$r(p) = -\sum_{k=0}^{p-1} N_k,$$

where P $\in$ {1,2, . . . , M}, wherein M is the number of downlink subframes associated with the uplink subframe, $N_k$ is the number of uplink control channel resources in subframe k.

According to some embodiments, the downlink control channel comprises a resource indicator for indicating the association (503) of each element in each set $(\Omega_0,\Omega_1,\Omega_2,\Omega_3)$ of unique uplink channel resources (420) with one element in the set of downlink control channel resources (410), wherein at least one of the resource indicator values is negative.

According to some embodiments, at least one of the at least one negative resource indicator values is obtained as a linear combination of one or several of the values $N_k$ where $N_k$ is the number of uplink control channel resources in subframe k.

The at least two subsets $\Phi_0,\Phi_1,\Phi_2,\Phi_3$ of references, may comprise indices to the respective downlink control channel resources 410 which may comprise any, some or all of: consecutive indices, subsets $\Phi_0,\Phi_1,\Phi_2,\Phi_3$ of equal sizes, comprises an increasing order of indices, and/or comprises a decreasing order of indices.

The two subsets $\Omega_0,\Omega_1,\Omega_2,\Omega_3$ of references, may comprise indices to the respective uplink control channel resources 420 may comprise any, some or all of: consecutive indices, subsets $\Omega_0,\Omega_1,\Omega_2,\Omega_3$ of equal sizes, comprises an increasing order of indices, and/or comprises a decreasing order of indices.

The available time-frequency resources are divided in Physical Resource Block, PRB, pairs mapped against the subsets $\Phi_0,\Phi_1,\Phi_2,\Phi_3$ of references such that at least one subset $\Phi_0,\Phi_1,\Phi_2,\Phi_3$ may correspond to one or more PRB pairs according to some embodiments.

The processing circuit 620 may be further configured for receiving HARQ feedback from the receiver 420, related to the transmitted data, on the unique uplink control channel resources 420 associated with the set of downlink control channel resources 410 relating to the data transmitted on the downlink data channel.

In addition, the radio network node 310 comprises a transmitting unit 630, configured for transmitting data on the downlink data channel associated with the downlink control channel.

In addition, according to some embodiments, the radio network node 310 may comprise a receiving unit 610, configured for receiving radio signals over a wireless interface. The radio signals may be received from e.g. the receiver 320, or any other entity configured for wireless communication according to some embodiments.

Furthermore, the radio network node 310 may comprise at least one memory 625, according to some embodiments. The memory 625 may comprise a physical device utilised to store data or programs i.e. sequences of instructions, on a temporary or permanent basis. According to some embodiments, the memory 625 may comprise integrated circuits comprising silicon-based transistors. Further, the memory 625 may be volatile or non-volatile.

The actions 501-506 to be performed in the radio network node 310 may be implemented through the one or more processing circuits 620 in the radio network node 310, together with computer program code for performing the functions of the actions 501-506. Thus a computer program product, comprising instructions for performing the actions 501-506 in the radio network node 310 may perform assignment of uplink control channel resources 420 for providing HARQ feedback for data transmitted on a downlink data channel associated with a downlink control channel, comprising at least a set of downlink control channel resources 410, which is configurable over a subset of available time frequency resources, when the instructions of the computer program code are loaded in the processing circuit 620.

The computer program product mentioned above may be provided for instance in the form of a data carrier carrying computer program code for performing at least some of the actions 501-506 according to some embodiments when being loaded into the processing circuit 620. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 310 remotely, e.g. over an Internet or an intranet connection.

Figure 7:
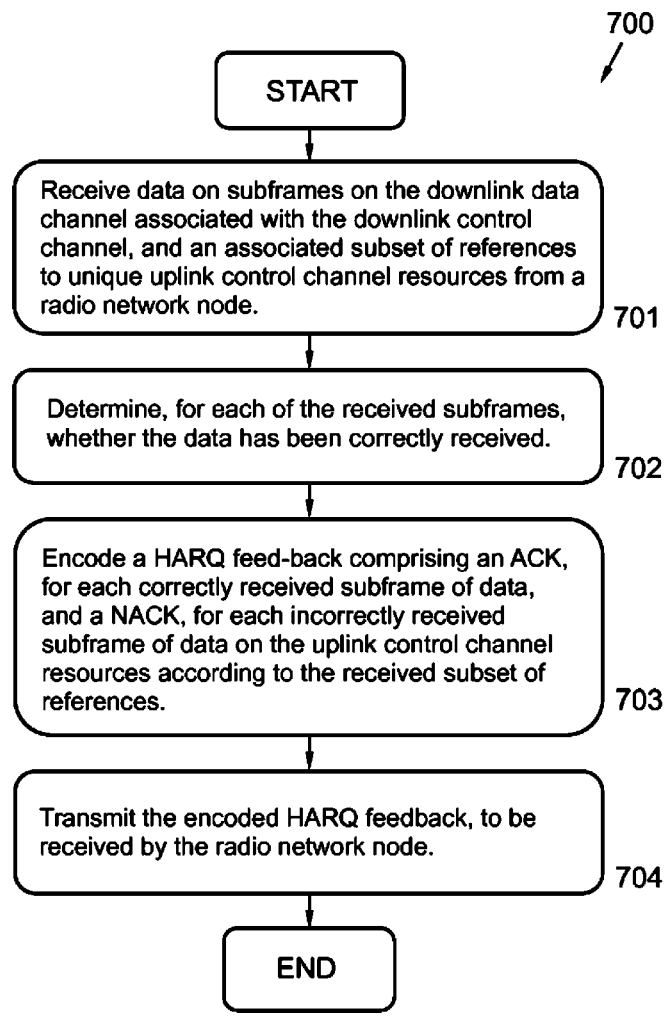
FIG. 7 is a flow chart illustrating a method in a receiver according to an embodiment of the invention.

FIG. 7 is a flow chart illustrating embodiments of a method 700 for use in a receiver 320 in a wireless communication system 300. The method 700 aims at providing HARQ feedback for data transmitted on a downlink data channel associated with a downlink control channel, comprising at least a set of downlink control channel resources 410, which is configurable over a subset of available time frequency resources.

The wireless communication system 300 may be based on Long-Term Evolution (LTE) within the Third Generation Partnership Project (3GPP) according to some embodiments, wherein the radio network node 310 may comprise e.g. an Evolved Node B. The receiver 320 may comprise a User Equipment (UE).

To appropriately perform the reception of the information entity, the method 700 may comprise a number of actions 701-704.

It is however to be noted that any, some or all of the described actions 701-704, may be performed in a somewhat different chronological order than the enumeration indicates, or even be performed simultaneously. The method 700 may comprise the following actions.

Action 701

Data is received on subframes on the downlink data channel associated with the downlink control channel, and an associated subset $\Omega_0, \Omega_1, \Omega_2, \Omega_3$ of references to unique uplink control channel resources 420 from a radio network node 310.

Action 702

For each of the received subframes, it is determined whether the data has been correctly received.

Action 703

A HARQ feedback comprising an acknowledgement (ACK) is encoded for each correctly received subframe of data, and a negative acknowledgement (NACK) is encoded for each incorrectly received subframe of data on the uplink control channel resources 420 according to the received 701 subset $\Omega_0, \Omega_1, \Omega_2, \Omega_3$ of references.

Action 704

The encoded 703 HARQ feedback is transmitted, to be received by the radio network node 310.

Figure 8:
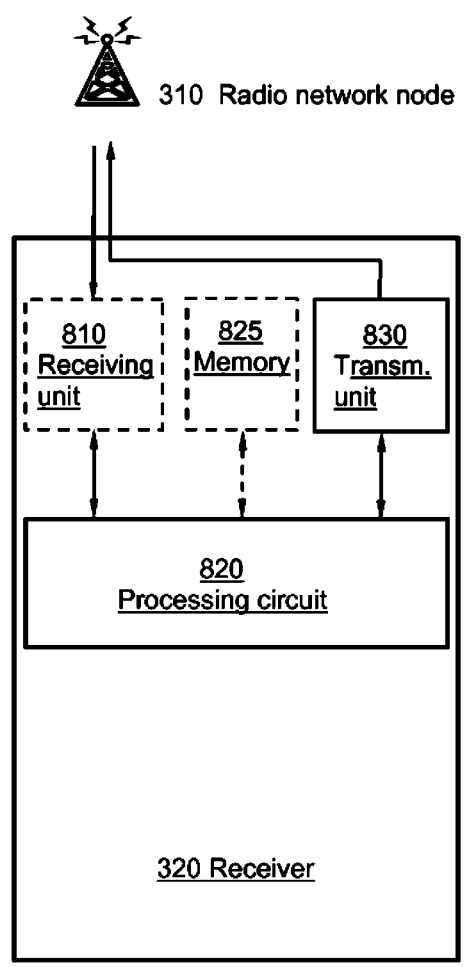
FIG. 8 is a block diagram illustrating a receiver according to an embodiment of the invention.

FIG. 8 is a block diagram illustrating a receiver 320 in a wireless communication system 300. The receiver 320 is configured for providing HARQ feedback for data transmitted on a downlink data channel associated with a downlink control channel, comprising at least a set of downlink control channel resources 410, which is configurable over a subset of available time frequency resources.

The wireless communication system 300 may be based on Long-Term Evolution (LTE) within the Third Generation Partnership Project (3GPP) according to some embodiments, wherein the radio network node 310 may comprise e.g. an Evolved Node B. The receiver 320 may comprise a User Equipment (UE), in some embodiments.

The receiver 320 is configured to perform any, some or all of the actions 701-704 for providing HARQ feedback to the radio network node 310.

For enhanced clarity, any internal electronics or other components of the receiver 320, not completely indispensable for understanding the herein described embodiments has been omitted from FIG. 8.

The receiver 320 comprises a receiving unit 810, configured for receiving data on subframes on the downlink data channel associated with the downlink control channel, and an associated subset $\Omega_0, \Omega_1, \Omega_2, \Omega_3$ of references to unique uplink control channel resources 420 from the radio network node 310.

The receiver 320 comprises a processing circuit 820, configured for determining, for each of the received subframes, whether the data has been correctly received, and configured for encoding a HARQ feed-back comprising an acknowledgement (ACK) for each correctly received subframe of data, and a negative acknowledgement (NACK) for each incorrectly received subframe of data on the uplink control channel resources 420 according to the received subset $\Omega_0, \Omega_1, \Omega_2, \Omega_3$ of references.

The processing circuit 820 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 820 may further perform data processing functions for inputting, outputting, and processing of data comprising data buffering and device control functions, such as call processing control, user interface control, or the like.

Furthermore, the receiver 320 comprises a transmitting unit 830, configured for transmitting the encoded HARQ feedback, to be received by the radio network node 310.

Furthermore, the receiver 320 may comprise at least one memory 825, according to some embodiments. The memory 825 may comprise a physical device utilised to store data or programs i.e. sequences of instructions, on a temporary or permanent basis. According to some embodiments, the memory 825 may comprise integrated circuits comprising silicon-based transistors. Further, the memory 825 may be volatile or non-volatile.

The actions 701-704 to be performed in the receiver 320 may be implemented through one or more processing circuits 820 in the receiver 320, together with computer program code for performing the functions of the actions 701-704. Thus a computer program product, comprising instructions for performing the actions 701-704 in the receiver 320 may provide HARQ feedback for data transmitted on a downlink data channel associated with a downlink control channel, comprising at least a set of downlink control channel resources 410, which is configurable over a subset of available time frequency resources, when the instructions of the computer program code are loaded in the processing circuit 820.

The computer program product mentioned above may be provided for instance in the form of a data carrier carrying computer program code for performing at least some of the actions 701-704 according to some embodiments when being loaded into the processing circuit 820. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 320 remotely, e.g. over an Internet or an intranet connection.

The terminology used in the detailed description of the invention as illustrated in the accompanying drawings is not intended to be limiting of the described methods 500, 700, radio network node 310 and receiver 320, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method for assignment of uplink control channel resources for providing Hybrid Automatic Repeat Request (HARQ) feedback for data transmitted on a downlink data channel associated with a downlink control channel, comprising at least a set of downlink control channel resources, which is configurable over a subset of available time frequency resources, the method comprising:
dividing, by a processing circuit of a radio network node, the set of downlink control channel resources into at least two subsets of references, comprising indices to the respective downlink control channel resources,
defining, by the processing circuit, for each such subset of references, an associated subset of references comprising indices to unique uplink control channel resources,
associating, by the processing circuit, each element in the associated subset of references with a subframe and an element in the subset of references, and
transmitting, by a transmitting unit of the radio network node, data on the downlink data channel associated with the downlink control channel;
wherein the element association is performed firstly in an increasing order of the number of downlink control channel resources and then in an increasing order of the number of the subframe, within each respective subset of references to downlink control channel resources; and
wherein the element association is performed by implementing the following:

$$m = n + \sum_{k=0}^{j-1} N_k$$

wherein:
m is an uplink resource index;
n is a downlink resource index;
j is a subframe index number;
$N_k$ is the number of uplink control channel resources in subframe k.

2. The method according to claim 1, wherein the downlink control channel comprises a resource indicator, wherein at least one value of said resource indicator is used for indicating the association of each element in each set of unique uplink channel resources with a subframe and one element in the set of downlink control channel resources.

3. The method according to claim 2, comprising using resource indicator values which are dependent on at least one of (a) the subframe index number j and (b) the number of downlink subframes, M, associated with the given uplink subframe.

4. The method according to claim 3, wherein at least one resource indicator value r(j) is $$r(j) = -\sum_{k=0}^{j-1} N_k$$

for at least one j, wherein j is the subframe index number of the downlink control channel comprising the resource indicator, $N_k$ is the number of uplink control channel resources in subframe k.

5. The method according to claim 3, wherein at least one resource indicator value r(p) is $$r(p) = -\sum_{k=0}^{p-1} N_k$$

where p ∈{1,2, . . . , M}, wherein M is the number of downlink subframes associated with the uplink subframe, $N_k$ is the number of uplink control channel resources in subframe k.

6. The method according to claim 1, wherein the element association is performed by implementing the following:

$$m=(M-j-1) \cdot N_c + j \cdot N_{c+1} + n$$

wherein:
m is an uplink resource index;
M is the number of downlink subframes;
N is the number of time-frequency resources;
j is a subframe index number;
n is a downlink resource index;
and wherein $$N_c = K \cdot c$$

where c is a non-negative integer chosen such that $N_c \leq n < N_{c+1}$ and K>0.

7. The method according to claim 1, wherein the element association is performed by implementing the following:

$$m = n + N \cdot j$$

wherein:
m is an uplink resource index;
n is a downlink resource index;
N is the number of time-frequency resources;
j is a subframe index number.

8. The method according to claim 1, wherein the downlink control channel comprises a resource indicator for indicating the association of each element in each set of unique uplink channel resources with a subframe and one element in the set of downlink control channel resources.

9. The method according to claim 1, wherein the downlink control channel comprises a resource indicator for indicating the association of each element in each set of unique uplink channel resources with one element in the set of downlink control channel resources, wherein at least one of the resource indicator values is negative.

10. The method according to claim 9, wherein at least one of the at least one negative resource indicator values is obtained as a linear combination of one or several of the values $N_k$ where $N_k$ is the number of uplink control channel resources in subframe k.

11. A radio network node, for assignment of uplink control channel resources for providing Hybrid Automatic Repeat Request (HARQ) feedback for data transmitted on a downlink data channel associated with a downlink control channel, comprising at least a set of downlink control channel resources, which is configurable over a subset of available time frequency resources, the radio network node comprising:
a processing circuit, configured to divide the set of downlink control channel resources into at least two subsets of references, comprising indices to the respective downlink control channel resources; define, for each such subset of references, an associated subset of references comprising indices to unique uplink control channel resources; and associate each element in the associated subset of references with a subframe and an element in the subset of references, and a transmitting unit, configured to transmit data on the downlink data channel associated with the downlink control channel;

wherein the element association is performed firstly in an increasing order of the number of downlink control channel resources and then in an increasing order of the number of the subframe, within each respective subset of references to downlink control channel resources; and wherein the element association is performed by implementing the following:

$$m = n + \sum_{k=0}^{j-1} N_k$$

wherein:
m is an uplink resource index;
n is a downlink resource index;
j is a subframe index number;
$N_k$ is the number of uplink control channel resources in subframe k.

12. A method for providing Hybrid Automatic Repeat Request (HARQ) feedback for data transmitted on a downlink data channel associated with a downlink control channel, comprising at least a set of downlink control channel resources, which is configurable over a subset of available time frequency resources, the method comprising:

receiving, by a receiving unit of a receiver, data on subframes on the downlink data channel associated with the downlink control channel, and an associated subset of references to unique uplink control channel resources from a radio network node, determining, by a processing circuit of the receiver, for each of the received subframes, whether the data has been correctly received, encoding, by the processing circuit, a HARQ feedback comprising an acknowledgement (ACK) for each correctly received subframe of data, and a negative acknowledgement (NACK) for each incorrectly received subframe of data on the uplink control channel resources according to the received subset of references, and transmitting, by a transmitting unit of the receiver, the encoded HARQ feedback, to be received by the radio network node;

wherein the set of downlink control channel resources is divided into at least two subsets of references, each element in the associated subset of references is associated with a subframe and an element in the subset of reference;

wherein the element association is performed firstly in an increasing order of the number of downlink control channel resources and then in an increasing order of the number of the subframe, within each respective subset of references to downlink control channel resources; and wherein the element association is performed by implementing the following:

$$m = n + \sum_{k=0}^{j-1} N_k$$

wherein:
m is an uplink resource index;
n is a downlink resource index;
j is a subframe index number;
$N_k$ is the number of uplink control channel resources in subframe k.

13. A receiver, configured for providing Hybrid Automatic Repeat Request (HARQ) feedback for data transmitted on a downlink data channel associated with a downlink control channel, comprising at least a set of downlink control channel resources, which is configurable over a subset of available time frequency resources, the receiver, comprising:

a receiving unit, configured to receive data on subframes on the downlink data channel associated with the downlink control channel, and an associated subset of references to unique uplink control channel resources from a radio network node, a processing circuit, configured to determine, for each of the received subframes, whether the data has been correctly received; encode a HARQ feed-back comprising an acknowledgement (ACK) for each correctly received subframe of data, and a negative acknowledgement (NACK) for each incorrectly received subframe of data on the uplink control channel resources according to the received subset of references, and a transmitting unit, configured to transmit the encoded HARQ feed-back, to be received by the radio network node wherein the set of downlink control channel resources is divided into at least two subsets of references, each element in the associated subset of references is associated with a subframe and an element in the subset of reference;

wherein the element association is performed firstly in an increasing order of the number of downlink control channel resources and then in an increasing order of the number of the subframe, within each respective subset of references to downlink control channel resources; and wherein the element association is performed by implementing the following:

$$m = n + \sum_{k=0}^{j-1} N_k$$

wherein:
m is an uplink resource index;
n is a downlink resource index;
j is a subframe index number;
$N_k$ is the number of uplink control channel resources in subframe k.

* * * * *

UNITED STATES PATENT AND TRADEMARK OFFICE
CERTIFICATE OF CORRECTION

| | | |
|---|---|---|
| PATENT NO. | : 9,578,639 B2 | Page 1 of 1 |
| APPLICATION NO. | : 14/671910 | |
| DATED | : February 21, 2017 | |
| INVENTOR(S) | : Berggren et al. | |

It is certified that error appears in the above-identified patent and that said Letters Patent is hereby corrected as shown below:

On the Title Page

Related U.S. Application Data should read:
-- Continuation of application No. PCT/EP2012/076586 --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*